United States Patent Office 3,549,697
Patented Dec. 22, 1970

3,549,697
METHOD OF PREPARING DIBASIC ACIDS
AND DERIVATIVES THEREOF
William J. Roberts, Bernardsville, and Joseph Di Pietro, New Providence, N.J., assignors to Celanese Corporation, New York, N.Y., a corporation of Delaware
No Drawing. Continuation of application Ser. No. 341,434, Jan. 30, 1964. This application Aug. 19, 1968, Ser. No. 755,502
Int. Cl. C07c 55/14, 55/02
U.S. Cl. 260—533  13 Claims

ABSTRACT OF THE DISCLOSURE

A process for producing dicarboxylic acids in good yield involves the free radical addition reaction between a compound containing terminal acetylenic unsaturation and a monocarboxylic acid or reactive derivative thereof.

This application is a continuation of Ser. No. 341,434, filed Jan. 30, 1964 and now abandoned.

This invention relates broadly to the preparation of chemical compounds such as organic compounds and, more particularly, organic carboxy compounds and organic nitriles. Still more particularly the invention is concerned with a new and unobvious method of making carboxylic acids, including substituted and unsubstituted mono- and polycarboxylic acids, from relatively inexpensive raw materials at low production costs. The invention is especially valuable and useful in directly producing acids such as adipic acid.

Many different methods of making carboxy compounds are known. For example, it has been suggested that formic acid be reacted with olefinic hydrocarbons such as ethylene, propylene or butylene to yield propionic, butyric or valeric acids, respectively, or with diolefins such as butadiene and isoprene to produce various dicarboxylic acids. The reaction is effected with the aid of metallic halides or inorganic acids as a catalyst. The prior art also teaches that long-chain fatty acids be made by a telomerization reaction between ethylene and an organic carboxylic acid having at least one alpha-hydrogen atom and which is free from olefinic and acetylenic unsaturation. The suggestion also has been made that saturated aliphatic carboxylic acids containing 3 to 13 carbon atoms per molecule be prepared by reacting saturated alphatic carboxylic acids containing from 1 to 5 carbon atoms per molecule with one or more moles of ethylene at pressures of 250–2500 p.s.i. and at temperatures of 75°–300° C. in the presence of a peroxide-type activator.

Organic acids such as adipic acid are widely used as chemical intermediates. Adipic acid, for example, is an important raw material in producing fiber-forming condensation polymers which, in filament, staple or tow form, are extensively used by the textile industry. Any improvement in a method of making adipic acid is, therefore, of considerable importance not only to the chemical industry but also to the fiber, textile and related industries. The present invention, in one of its specific embodiments, is one solution to the long-existing problem of producing adipic and other carboxylic acids economically, in a high degree of purity when desired, from readily available raw materials, and by a process and with equipment which permits flexibility in operations so that changes can be readily made for producing another product or type of product when there is no substantial demand for the particular product or type of product then being made.

Briefly described, the present invention is based on our discovery that organic compounds including organic carboxy compounds such as adipic acid, and others, can be produced by bringing into reactive relationship, as by reacting together under heat, in the presence of a free-radical initiator (e.g., a peroxide catalyst), (1) at least one organic compound containing acetylenic unsaturation between adjacent carbon atoms, e.g., acetylene (unsubstituted acetylene), and/or a mono- and/or a disubstituted acetylene, and/or an acetylene containing a plurality (e.g., two) of acetylenic linkages or containing one or more of both acetylenic and ethylenic linkages. The second of the two primary reactants employed is (2) a chain-transfer agent, more particularly at least one organic compound selected from the group consisting of organic nitriles (especially aliphatic nitriles), organic carboxylic acids, and anhydrides, salts and esters of organic carboxylic acids. The acids, anhydrides, salts, esters and nitriles just mentioned are free from ethylenic (olefinic) and acetylenic unsaturation.

The reaction is preferably carried out under anhydrous conditions, especially when the acetylenic compound is a highly reactive compound such as unsubstituted acetylene; but this may not be necessary when using some of the less reactive substituted acetylenes.

It will be understood, of course, by those skilled in the art that when one uses a mixture of different acetylenic compounds as the acetylenic reactant and a single or a mixture of different organic carboxy compounds or an organic nitrile as the second reactant, the product is a mixture of different organic compounds. Similarly, the end-product is a mixture of different organic compounds when one uses a single acetylenic reactant with a plurality of different organic compounds as the second reactant.

The reaction is preferably carried out using a large molar excess of the chain-transfer agent over stoichiometrical proportions with respect to the acetylenic compound. The excess chain-transfer agent functions as a reaction medium or diluent and permits better control of the reaction including the reaction temperaure. However, in some cases it may be desirable that, in lieu of or in addition to the large molar excess of chain-transfer agent, there be included in the reaction mass a different liquid reaction medium, e.g., an inert, volatile (volatilizable), saturated, aliphatic hydrocarbon or an aromatic hydrocarbon which is liquid under the reaction conditions.

Taking a peroxide catalyst represented by the general formula shown in Equation I as illustrative of a free-radical initiator, the production of adipic acid by the radical addition of acetic acid to acetylene may be illustrated by the following series of equations:

(I)
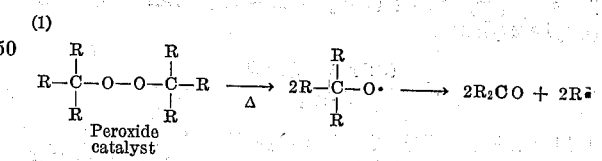
Peroxide catalyst (II)
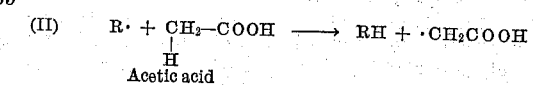
Acetic acid (III)

(IV)
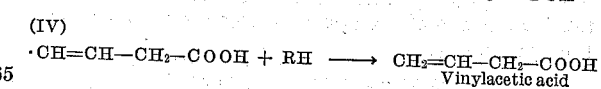
Vinylacetic acid (V)
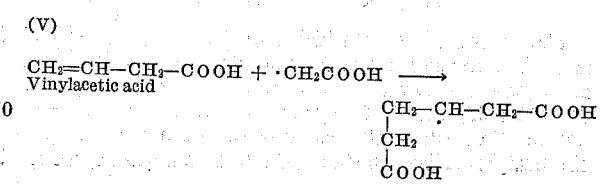
Vinylacetic acid (VI)
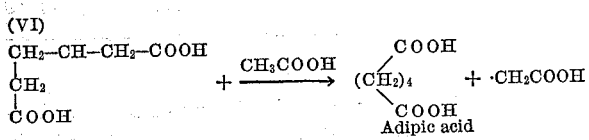

THE ACETYLENIC REACTANT

The acetylenic reaction has been broadly described in the second paragraph immediately preceding as at least one organic compound containing acetylenic unsaturation between adjacent carbon atoms. Thus, it may be one or more organic compounds wherein the acetylenic unsaturation is terminal or internal. The acetylenic reactant may be a monoacetylene or a polyacetylene, specifically a diacetylene. A more specific class of useful acetylenic reactants are those containing a single, terminal CH≡C— grouping which, of course, includes acetylene itself, CH≡CH, and which is the preferred acetylenic reactant.

Acetylenic compounds that are useful in practicing this invention include those represented by the general formula:

(VII)    RC≡CR' wherein R and R' each represent a member of the group consisting of hydrogen and alkyl (including cycloalkyl), alkenyl alkynyl, alkyl-alkynyl, alkenyl-alkynyl, aralkyl, aryl and alkaryl radicals. Examples of acetylenic compounds embraced by Formula I are acetylene, monosubstituted acetylenes and disubstituted acetylenes, more particularly mono-hydrocarbon-substituted) acetylenes and di(hydrocarbon-substituted) acetylenes.

When a substituted acetylene is employed, preferably it is one which is only monosubstituted, e.g., those embraced by Formula VII wherein one of the R's represents hydrogen; or, otherwise stated, those represented by the general formula:

(VIII)    RC≡CH where R has the same meaning as the R in Formula VII.

Examples of monosubstituted acetylenic compound embraced by Formula VII and from which examples of disubstituted acetylenic compounds will be obvious to those skilled in the art, are monomethyl through monooctadecyl acetylenes (including the isomeric forms of the alkyl substituent, and the cycloalkyl acetylenes such as cyclopentyl, cyclohexyl, cycloheptyl, etc, acetylenes), and other monoalkyl acetylenes; vinyl-acetylene (CH₂=CH—CH≡CH)

3-vinyl-propyne-1 (CH₂=CH—CH₂—C≡CH), ispropenyl acetylene (CH₂=C—C≡CH)
      |
      CH₃

1,5-hexadiyne [CH≡C—(CH₂)₂—C≡CH], 1,6-heptadiyne, 1,7-octadiyne, 1,8-nonadiyne, and other monoalkenyl acetylenes, monoalkynyl acetylenes, mono(alkyl-alkynyl) acetylenes and mono-(alkenyl-alkynyl) acetylenes; the benzyl, phenylethyl, phenylpropyl and other monoaralkyl acetylenes; phenyl, biphenylyl or xenyl, naphthyl and other monoaryl acetylenes; the tolyl xylyl, ethylphenyl, propylphenyl, methyl- and dimethylnaphthyl and other monoalkaryl acetylenes. Other examples of useful substituted acetylenes will be apparent from the foregoing illustrative examples.

THE SECOND REACTANT

The second reactant, which may be broadly described as a chain-transfer agent, is preferably an organic nitrile, an organic carboxylic acid, or an anhydride, salt or ester of said acid, and is free from ethylenic and acetylenic unsaturation. Illustrative examples of such reactants are the straight- or branched-chain, saturated aliphatic, mono- carboxylic acids, for instance those represented by the general formula:

R—COOH where R represents an alkyl radical containing from 1 to about 24 carbon atoms or more. The organic acid also may be halogenated or otherwise substituted; for instance, a dichlorinated or difluorinated alkanoic acid such as dichloro- and difluoracetic acids may be employed. The alpha, alpha-dimethyl, -diethyl and higher -dialkylacetic acids also may be used, these acids being embraced by the aforementioned formula R—COOH. Preferably R in this formula represents a lower alkyl ($C_1$ to about $C_6$ alkyl) radical, specifically a methyl radical. The various hydroxyalkanoic acids such as glycolic acid and the various hydroxylated propionic, butyric, valeric and higher alkanoic acids are examples of other useful chain-transfer agents.

The use of polyfunctional acids such as polycarboxylic acids is not precluded but cause the reaction to be more complex, i.e., less "clean cut."

Acetic anhydride and the other available anhydrides of organic carboxylic acids such as those mentioned, supra, by way of illustration may be used in lieu of or in addition to the acids themselves; or one may similarly use salts or esters of the organic carboxylic acids, or organic nitriles such as saturated aliphatic nitriles. Examples of such salts are those represented by the general formula:

(R'—COO)ₙMe wherein R' has the same meaning as R in the formula R—COOH, Me represents a monovalent or polyvalent, inorganic, salt-forming cation, and $n$ represents an integer which corresponds to the valence of Me. Thus Me may represent such cations as, for example, sodium, potassium or other alkali metal, calcium, strontium, barium or magnesium. Examples of esters that may be employed instead of the carboxylic acids are the alkyl and hydroxyalkyl including cycloalkyl and hydroxycycloalkyl esters, e.g., the methyl through amyl and the cyclohexyl esters (and the corresponding hydroxyalkyl esters), of the acids embraced by the aforementioned general formula

R—COOH

Examples of suitable organic nitriles are saturated aliphatic nitriles (alkyl nitriles), and include those nitriles represented by the general formula:

R—CN wherein R has the same meaning as the R in the formula R—COOH and, as in the last-named formula, is preferably a lower alkyl radical, specifically a methyl radical.

THE FREE-RADICAL INITIATOR

Although not limited thereto, the free-radical initiator is advantageously a peroxide and, more particularly, an organic peroxide such as a dialkyl peroxide. Thus, the initiator may be one represented by the general formula:

(IX)
$$\begin{array}{c} R \quad\quad R_5 \\ | \quad\quad\quad | \\ R_1-C-O-O-C-R_4 \\ | \quad\quad\quad | \\ R_2 \quad\quad R_3 \end{array}$$

wherein each of the various R's, which may be the same or different but which are preferably symmetrical, represent a member of the group consisting of hydrogen and alkyl (including cycloalkyl), aralkyl, aryl and alkaryl radicals. Illustrative examples of radicals represented by each of the various R's are methyl, ethyl and propyl through octadecyl (both normal and isomeric forms), cyclopentyl, cyclohexyl, cycloheptyl, benzyl, phenylethyl, phenylpropyl, tolyl, xylyl and others that will be apparent to those skilled in the art from the foregoing illustrative examples. Specific examples of peroxides embraced by the above formula also will be apparent to those skilled in the art from the aforementioned specific examples of substituents represented by the various R's.

More specific examples of free-radical initiators are di-t.-butyl peroxide, di-t.-amyl peroxide and other dialkyl peroxides; the symmetrical diacyl peroxides, for instance peroxides which commonly are known under such names as acetyl peroxide, propionyl peroxide, lauroyl peroxide, stearoyl peroxide, malonyl peroxide, succinyl peroxide, phthaloyl peroxide, benzoyl peroxide, etc.; unsymmetrical or mixed diacyl peroxides, e.g., acetyl benzoyl peroxide, propionyl benzoyl peroxide, etc.; the organic per-salts, e.g., t.-butyl perbenzoate, t.-amyl perbenzoate, etc.; the inorganic per-salts, e.g., the sodium, potassium and other alkali-metal and the ammonium per-salts such as the persulfates, perborates and perphosphates; and others known in the art (e.g., U.S. Pat. No. 2,818,362, col. 5, line 68, through line 38, col. 6).

CONDITIONS OF REACTION

*Proportions of reactants.*—The acetylenic reactant is reacted with the chain-transfer agent such as an organic nitrile or an organic carboxy compound using a molar excess, e.g., from about 3.0 moles to about 500 or more moles (preferably from about 10 moles to about 100 moles) in excess, of the latter over stoichiometrical proportions.

A catalytic amount of a free-radical initiator is employed. Although this amount will vary considerably, the free-radical initiator is generally present in the reaction mass in from about 0.01 to about 0.1 mole percent of the molar amount of the acetylenic reactant. For economic reasons, obviously no more initiator should be employed than the minimum required to produce the desired results.

*Temperature of reaction.*—The reaction is usually carried out under heat, e.g., at a temperature ranging from about 50° C. to about 150° C. or even 300° C., depending, for instance, upon the particular acetylenic reactant, chain transfer agent and initiator employed, the particular mode of operation (i.e., continuously, semi-continuously or batch) type of equipment used, and other influencing factors. The free-radical initiator is especially important in connection with the temperature of the reaction since the different initiators decompose at different temperatures.

In a preferred technique when the acetylenic reactant is normally a gas, e.g., acetylene, an admixture of the chain-transfer agent, e.g., glacial acetic acid, and free-radical initiator, e.g., a dialkyl peroxide, are preheated within the aforementioned temperature range, more particularly to from about 100° C. to about 125° C., and the acetylene is passed into the preheated solution of chain-transfer agent and free-radical initiator.

*Pressure of reaction.*—Depending upon the particular reactants employed, the reaction may be carried out at atmospheric, superatmospheric or subatmospheric pressure or by any combinations thereof. In selecting a reaction pressure one takes into consideration, of course, the vapor pressure of the particular reactants used, the type of equipment employed and other conditions of reaction.

*Time of reaction.*—In general, the time of reaction will vary with the particular reactants and initiator chosen and the temperature of the reaction. For example, in batch operations it may range from about ½ to 72 hours or more. Ordinarily, the time may be shortened by carrying out the reaction at a higher temperature or both at a higher temperature and under superatmospheric pressure when such pressure is required to secure a liquid-phase or a liquid-vapor-phase reaction at the higher temperature. Of course, one should then use a free-radical initiator which decomposes at the higher temperature or other conditions employed.

*Reaction medium.*—As indicated hereinbefore, the reaction may be carried out, if desired, while the primary reactants and the free-radical initiator are contained in a liquid reaction medium, more particularly an inert (substantially completely inert) liquid reaction medium. By "inert" or "substantially completely inert" is meant a reaction medium, solvent or diluent which is so inert under the reaction conditions that it will not adversely affect the course of the reaction or the reaction products. By "liquid" is meant a reaction medium which is liquid at the reaction temperature. In other words, the reaction medium may or may not be liquid at normal or at ambient temperature so long as it is liquid or in liquid state at the reaction temperature. Preferably the liquid reaction medium is one which is volatile without decomposition.

Any reaction medium meeting the above requirements is satisfactory for use. Illustrative examples of useful reaction media are the various alkanes (including cycloalkanes), n-pentane, n-hexane, n-heptane, n-octane, iso-octane, n-nonane and higher members of the homologous series; aromatic hydrocarbons, e.g., benzene, toluene, xylene, etc.; and others that will be apparent to those skilled in the art from the foregoing illustrative examples. In some cases it may be advantageous to use, as the liquid reaction medium, an admixture of water (e.g., in minor amount) with an organic solvent.

When the reaction is effected in an inert liquid reaction medium, the concentration of the primary reactants (acetylenic reactant plus chain-transfer agent) in the said medium may be varied considerably, but ordinarily they constitute, by weight, from about 20% to about 80% of the total reaction mass (i.e., primary reactants, free-radical initiator and inert liquid reaction medium).

Preferably an excess of the chain-transfer agent, specifically acetic acid when employed as such agent, constitutes the reaction medium.

It is not essential that all of the free-radical initiator be added initially to the reaction mixture. Thus, better resuls are usually obtained when the initiator is added gradually during the course of the reaction. The initiator may be added in increments or a solution of the initiator may be pumped slowly into the reaction zone throughout most, if not all, of the reaction period.

At the end of the period of reaction the inert reaction medium (if employed) and any unreacted material are removed by any suitable means, e.g., by distillation, leaving a residue of crude product comprising organic carboxy compound (or an organic nitrile when the chain-transfer agent is an organic nitrile). This crude product may be purified by any suitable means known in the art, e.g., washing, extraction, filtration, crystallization, etc., or any combination or repetitions of such purification techniques.

The products of this invention are useful in known applications for organic carboxy compounds or organic nitriles, e.g., as chemical intermediates.

In order that those skilled in the art may better understand how the present invention can be carried into effect, the following examples are given by way of illustration and not by way of limitation. All percentages are by weight unless otherwise stated.

EXAMPLE I

One and eight-tenths (1.8) kg. of glacial acetic acid and 2.0 g. of di-t.-butyl peroxide are charged to a stainless-steel rocker-type bomb. The system is purged with nitrogen gas, pressurized to 400 p.s.i.g., vented and purged once with acetylene gas. The solution of glacial acetic acid and peroxide is then heated to 110°–118° C., after which any excessive pressure build-up that develops in the system during the heating period is released. Acetylene gas is bubbled into the solution in the bomb at the rate of about 100 ml. per minute over a period of 47 minutes. At the end of this period of time, the pressure is 18 p.s.i.g. The flow of acetylene is discontinued, and the reaction is allowed to continue for an additional 24 hours at 115°–120° C. while the bomb is being rocked. The bomb is cooled, and the yellow liquid reaction mass is distilled to remove the excess acetic acid and to leave a residue comprising crude adipic acid in a yield of approximately 60% based on the amount of acetylene consumed.

The crude product is washed with cold water, and then recrystallized from ethanol; M.P. 150°–151° C. Infrared examination and analyses for carbon and hydrogen confirm that the product is adipic acid.

Similar results are obtained by bubbling the acetylene gas into the acetic acid-peroxide solution over a period of 4 hours at a rate of 20 ml. per minute; and also, when the period of heating after discontinuing the flow of acetylene gas is 48 hours instead of 24 hours.

EXAMPLE II

Example I is repeated using an equivalent molar amount of acetic anhydride in place of acetic acid, yielding adipic acid as in Example I.

EXAMPLE III

Essentially the same procedure is followed as described in Examples I and II with the exception that there is substituted, in individual runs, an equivalent molar amount of the following initiators in place of di-t.-butyl peroxide:

(a) Di-t.-amyl peroxide
(b) Di-t.-butyl perbenzoate
(c) Dibenzoyl peroxide
(d) Diacetyl peroxide
(e) Potassium persulfate The same product, adipic acid, is obtained in varying yields.

EXAMPLE IV

Same as in Example I with the exception that only ¼ (0.5 g.) of the di-t.-butyl peroxide is added initially and the remaining 1.5 g. is added in increments throughout the total reaction period of 25 hours. More particularly two increments of 0.25 g. each are added at ½-hour intervals, four increments of 0.125 g. each are added at 1-hour intervals, and ten increments of 0.05 g. each are added at intervals of approximately 2 hours. The additions are made in the form of a solution of the peroxide dissolved in a small amount of glacial acetic acid. A more efficient utilization of the catalyst per unit of product (adipic acid) formed is obtained when the catalyst is added incrementally or in steady state throughout the course of the reaction.

Two (2) kg. of n-nonane, 0.5 kg. of propionic acid and 2.0 g. of di-t.-butyl peroxide are charged to a stainless-steal rocker-type bomb. The system is purged with an inert gas, specifically nitrogen, pressurized to 400 p.s.i.g., vented and purged once with acetylene gas. The resulting solution is then heated to 120°–125° C., after which any excessive pressure build-up that develops in the system during the heating period is released. Acetylene gas is bubbled into the solution in the bomb at the rate of 100–200 ml. per minute over a period of from 50 to 100 minutes. At the end of this period the pressure is about 35 p.s.i.g. The flow of acetylene is discontinued, and the reaction is allowed to proceed for an additional 12 hours at about 125° C. The bomb is cooled, and the yellow, liquid reaction mass is distilled to remove the n-nonane (inert reaction medium) and unreacted propionic acid. The residue comprises crude 2,5-dimethyladipic acid in a yield of approximately 50% based on the amount of acetylene consumed. The crude product can be purified by recrystallization one or more times from ethanol.

EXAMPLE VI

One and eight-tenths (1.8) kg. of glacial acetic acid and 2.0 g. of di-t.-butyl peroxide are charged to a stainless-steel rocker-type bomb. The system is purged with N₂, pressurized to 400 p.s.i.g., vented and purged once with acetylene gas. The solution of glacial acetic acid and peroxide is then heated to 110°–118° C., after which any excessive pressure build-up that develops in the system during the heating period is released. Vinylacetylene gas is bubbled into the solution in the bomb at the rate of about 100 ml. per minute over a period of from 50 to 100 minutes. At the end of this period of time the pressure is about 18 p.s.i.g. The flow of acetylene is discontinued, and the reaction is allowed to continue for an additional 12 hours at 120°–125° C. while the bomb is being rocked. The bomb is cooled, and the yellow liquid reaction mass is distilled to remove excess acetic acid. The residue comprises crude 4-carboxymethyloctanedioic in a yield of approximately 30% based on the amount of vinylacetylene consumed.

EXAMPLE VII

Essentially the same procedure is followed as described in Examples I, III, and IV with the exception that there is substituted, in individual runs, an equivalent molar amount of the following chain-transfer agents in place of glacial acetic acid:

(a) Sodium acetate
(b) Methyl acetate
(c) Acetonitrile

The crude product obtained from the individual runs comprises (a) disodium adipate, (b) dimethyl adipate and (c) adiponitrile.

It will be understood, of course, by those skilled in the art that the present invention is not limited only to the use of the specific ingredients, proportions and other conditions of reaction given in the foregoing examples by way of illustration. Thus, instead of the particular reactants, free-radial initiators and proportions thereof given in the individual examples, one may use any of the other reactants and free-radical initiators given in the portion of this specification prior to the examples. Such ingredients may be employed in the proportions and under the conditions of reaction set forth hereinbefore.

The embodiments of the invention in which an exclusive property or privilege is claimed are defined as follows:

1. The method of producing a dicarboxylic acid or the salt or ester thereof which comprises bringing into reactive relationship (1) at least one organic hydrocarbon compound containing a terminal acetylenic unsaturation and (2) at least one organic compound containing a

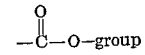

and selected from the group consisting of organic monocarboxylic alkanoic and halogenated and hydroxy alkanoic acids and the anhydrides, salts and esters thereof, said acids, anhydrides, salts and esters being free from ethylenic and acetylenic unsaturation and having the

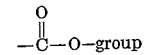

bonded directly to a carbon bearing more than one hydrogen atom in the presence of at least 0.01 mol percent based on molar amount of (1) of a free-radical initiator.

2. A method as in claim 1 wherein the organic compound of (1) is acetylene.

3. A method as in claim 1 wherein the acid is acetic acid.

4. A method as in claim 1 wherein the free-radical initiator comprises an organic peroxide.

5. The method of preparing a dicarboxylic acid which comprises reacting acetylene with a large molar excess of a saturated aliphatic monocarboxylic acid, said reaction being effected under heat and superatmospheric pressure in the presence of at least 0.01 mol percent based on molar amount of acetylene of an organic peroxide free radical catalyst; and isolating the dicarboxylic acid that is formed from the resulting reaction mass.

6. A method as in claim 5 wherein the saturated aliphatic monocarboxylic acid is acetic acid.

7. The method of producing adipic acid by reaction between acetylene and acetic acid or acetic anhydride which comprises passing acetylene into a large molar excess of acetic acid or acetic anhydride containing a catalytic amount of an organic peroxide free radical catalyst, the admixture of acetic acid or acetic anhydride and peroxide having been preheated to between about 50 degrees centigrade and about 150 degrees centigrade and the said reaction being effected under superatmospheric pressure; isolating and recovering adipic acid from the resulting reaction mass in at least 50 percent yield based on acetylene.

8. A method as in claim 7 wherein the organic peroxide catalyst comprises a peroxide represented by the general formula

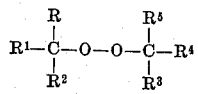

wherein each of the various R's represent a member of the group consisting of hydrogen and alkyl, aralkyl, aryl and alkaryl radicals.

9. A method as in claim 8 wherein the peroxide within the scope of the defined genreal formula is a dialkyl peroxide.

10. A method as in claim 7 wherein the temperature to which the admixture of acetic acid and peroxide is preheated is from about 100 degrees centigrade to about 125 degrees centigrade.

11. A method as in claim 8 wherein the peroxide within the scope of the defined general formula is di-t-butyl peroxide.

12. The method of producing 2,5-dimethyladipic acid by reaction between acetylene and propionic acid which comprises passing acetylene into a large molar excess of propionic acid containing a catalytic amount of at least 0.01 mol percent based on the molar amount of acetylene of an organic peroxide free radical catalyst, the admixture of propionic acid and peroxide having been preheated to between about 50 degrees centigrade and about 150 degrees centigrade and the said reaction being effected under superatmospheric pressure; isolating and recovering 2,5-dimethyladipic acid from the resulting reaction mass in at least 50 percent yield based on acetylene.

13. The method of producing 4-carboxymethyloctanedioic acid by reaction between vinylacetylene and acetic acid which comprises passing vinylacetylene into a large molar excess of acetic acid containing a catalytic amount of at least 0.01 mol percent based on the molar amount of vinylacetylene of an organic peroxide free radical catalyst, the admixture of acetic acid and peroxide having been preheated to between about 30 degrees centigrade and about 150 degrees centigrade and the said reaction being effected under superatmospheric pressure; isolating and recovering 4-carboxymethyloctanedioic acid from the resulting reaction mass in at least 50 percent yield based on vinylacetylene.

References Cited
UNITED STATES PATENTS
2,402,137  6/1946  Hanford et al. _____ 260—488
3,256,315  6/1966  David et al. _____ 260—642

OTHER REFERENCES
Piganiol, "Acetylene Homologues and Derivatives," (1950), pp. 170–171.

Raphael, "Acetylenic Compounds in Organic Synthesis," (1950), pp. 43–45.

Roberts and Caserio, "Organic Chemistry," Benjamin, N.Y., 1965, p. 683.

Royals, "Advanced Org. Chem." Constable & Co., London, 1954, pp. 731-2.

LORRAINE A. WEINBERGER, Primary Examiner

D. E. STENZEL, Assistant Examiner

U.S. Cl. X.R.
260—465.3, 485, 514, 515, 537